Patented Jan. 4, 1938

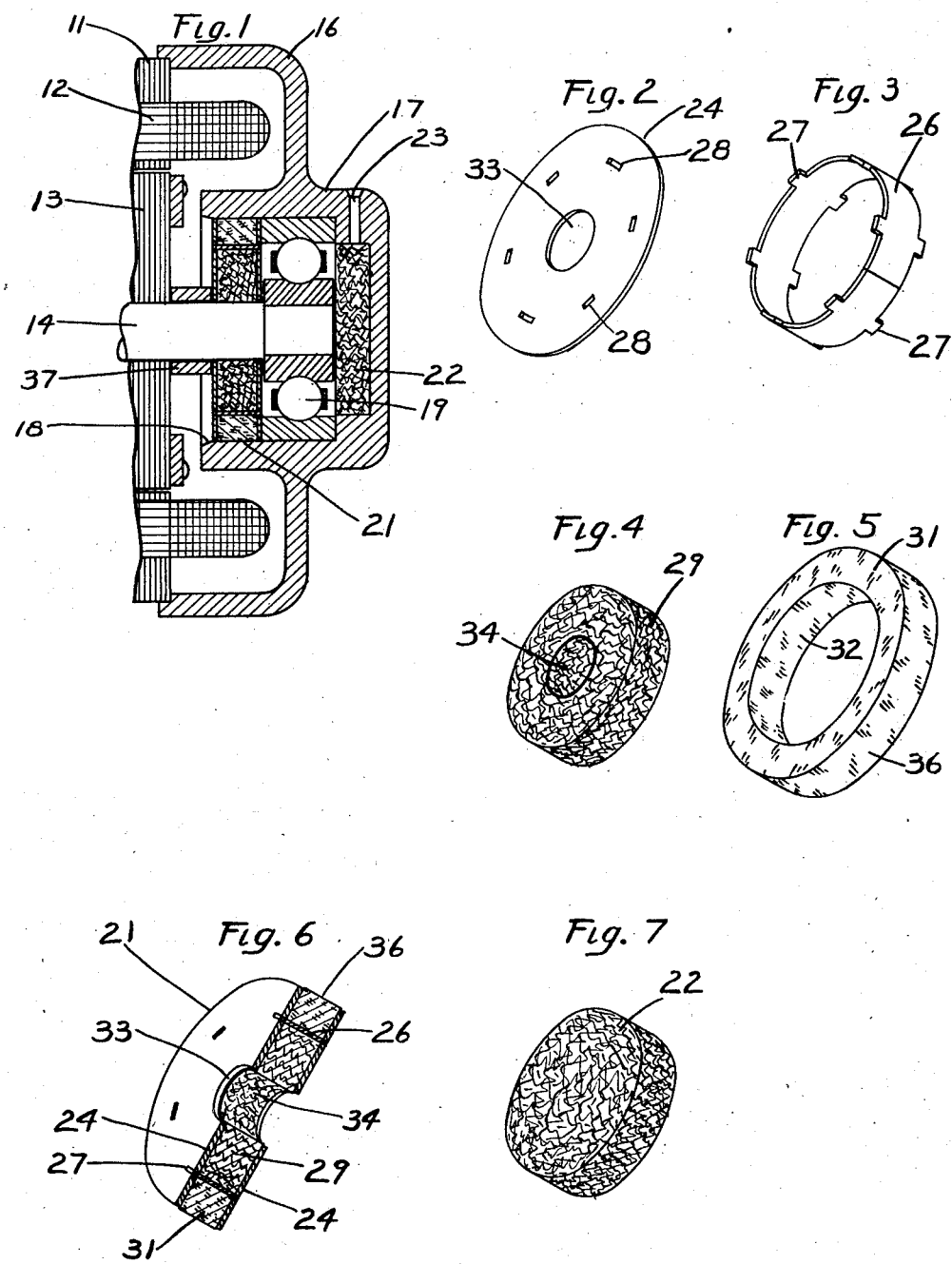

2,104,188

UNITED STATES PATENT OFFICE 2,104,188

SEAL FOR BALL BEARING STRUCTURES

Frederick W. Cotterman, Dayton, Ohio, assignor to Bessie D. Apple, Dayton, Ohio

Application January 7, 1935, Serial No. 674

4 Claims. (Cl. 288—1)

This invention relates to an enclosed structure containing a ball bearing with particular reference to means for feeding the lubricant to the bearing and retaining it within the enclosure.

An object of the invention is to improve and simplify the bearing closing means ordinarily used in the inner open end of the hollow hub which contains and supports the outer ball bearing race to the end that such closing means may be inserted and removed without screws or other fastening means and yet may effectively retain the oil in the bearing.

Another object is to provide an improved means to retain the supply of oil injected into the bearing housing and feed it to the ball bearing gradually.

That these objects are attained will appear from a consideration of the following description, reference being had to the accompanying drawing wherein, Fig. 1 is a fragmentary axial section through a motor having a ball bearing arrangement embodying the invention.

Fig. 2 is a perspective view of one of the metal side plates of the oil retainer used in the bearing structure.

Fig. 3 is a perspective view of the metal spacer used in the oil retainer.

Fig. 4 is a perspective view of the absorptive washer used in the oil retainer.

Fig. 5 is a perspective view of the non-absorptive ring used in the oil retainer.

Fig. 6 is a fragmentary perspective view of the assembled oil retainer.

Fig. 7 is a perspective view of the felt oil supply disc.

Similar numerals refer to similar parts throughout the several views.

The motor which has been selected to illustrate the invention comprises the laminated stator core 11 with coils 12, the squirrel cage rotor 13 secured to the shaft 14 and an end head 16 which carries the bearing hub 17 within which the ball bearing and the improved oil retaining means are contained.

The bearing hub 17 is open at the inner end and is slightly bell-mouthed at 18 to facilitate entry of the ball bearing 19 and the oil retainer 21. Hub 17 is recessed at the outer closed end for the oil supply disc 22, Fig. 7. An oil hole 23 extends through the wall of the hub 17 to carry oil to the supply disc 22.

The oil retainer 21 is shown in fragmentary perspective in Fig. 6 and comprises two metal side plates 24, Fig. 2, held axially spaced apart by the spacing tube 26, Fig. 3. Spacing tube 26 is made of a strip of sheet metal bent to circular form and has a series of tenons 27 at each edge. The tenons 27 are entered through corresponding openings 28 in the side plates 24 and are riveted with the absorptive washer 29, Fig. 4 and the non-absorptive ring 31, Fig. 5, in place. In the embodiment shown felt is employed for the washer 29 and cork for the ring 31.

The cork ring 31 has an inner diameter 32 which fits snugly over the outside of the spacing tube 26, and a width which fits tightly between plates 24 after assembly. The side plates 24 have a central opening 33 which fits the shaft 14 somewhat loosely, but the felt washer 29 has a central opening 34 which is normally somewhat smaller than the shaft. The washer 29 is made of relatively soft felt in order that its central opening 34 may readily expand to go over the shaft 14 or may shift transversely to compensate for slight eccentricity between the shaft and the bore of the hub 17.

After the oil retainer is completed as in Fig. 6 the outer diameter 36 of the cork ring 31 is preferably ground concentric with the central openings 33 of the side plates 24 and to an outside dimension very slightly larger than the bore of the bearing hub 17. The oil retainer 21 is then placed on the shaft 14 with a collar 37 between it and the rotor 13 and with the ball bearing 19 on the outer end of the shaft. The rotor assembly may then be pushed endwise through the stator core 11, the ball bearing 19 entering the hub 17 first and the oil retainer following the bearing, the cork ring 31 being compressed sufficiently to allow it to enter the bore of the hub and make a seal.

The oil supply disc 22 is made of relatively hard felt so that when the oil hole 23 is filled with oil the disc will not immediately absorb it. This discourages the use of too much oil at one time. When the hard felt of the disc does absorb the oil it does not give it up so easily but feeds it gradually to the end of the shaft 14 which touches it. The disc 22 also acts as a filter for the oil so that no foreign matter may enter the bearing.

The oil which is fed by the oil supply disc 22 to the bearing 19 does not readily escape from the bearing once it gets to it because the cork ring 31 fits the bore of the bearing hub 17 tightly and the cork is non-absorptive. In order that oil may escape from the bearing 19 it must escape through the central opening 33 of the inner side plate 24, and such small amount of oil as does escape through this opening 33 will be absorbed by the soft felt washer 29.

The advantages of the improved structure over common practice are obvious. For, where the outer diameter of the oil retainer is entirely of metal, as it sometimes is in common practice, it may not be made to fit tightly enough to retain the oil, for then it may not readily be withdrawn once it was assembled. A metal retainer may of course be threaded into the inner end of the hub 17, but it will then be too difficult to get at it to screw it into place.

Again conventional retainers sometimes comprise a single felt washer extending from the shaft 14 to the bore of the hub 17 held between metal washers, but in such a structure the oil may escape around the inner side plate 24 at the bottom of the bearing bore and be absorbed by the felt washer as fast as the supply disc gives it up to the bearing. Not only this but where the oil retainer is entirely of soft felt there is no adequate assurance that the washer will not revolve with the shaft and wear its entire diameter away by rubbing against the bore of the bearing hub inasmuch as the felt is of too yielding a nature to offer much frictional resistance to turning.

The oil retainer could not well be entirely made from cork or similar material, because if the cork would be fitted tightly enough to the shaft to retain oil it would offer too much frictional resistance to the rotation of the shaft, and if made loose enough to permit the shaft to turn readily, it would not keep the oil from escaping around the shaft. Besides the cork being non-absorptive would permit oil to enter the inside of the motor. And the cork would not yield sufficiently to compensate for any eccentricity between its outer and inner diameter.

It is only by having the inner end of the bearing closed by an oil retainer which comprises a slightly compressible non-absorptive material at the outer diameter and a highly yieldable absorptive material at its inner diameter that the advantages of the invention are realized. Further advantages are had by adding the metal parts in the manner shown and described whereby the bearing may contain considerable oil in the space around the balls before any may get to the felt washer and be absorbed thereby, inasmuch as there must be sufficient oil in the bearing to almost half fill it before it may escape through the central opening 33 of the plates 24.

When it becomes necessary to remove the rotor assembly from the stator assembly, it is only necessary to pull on the rotor slightly and the cork ring will be withdrawn, although it is tight enough to prevent oil leakage and to prevent turning of the retainer in the hub. The bell-mouthed end 18 of the bore of the hub 17 permits easy assembly of the rotor and stator units.

Having described an embodiment of my invention,

I claim:—

1. For pressing into and sealing the space between the outside of a shaft and the inside of a bearing supporting hub which surrounds the shaft at some distance therefrom, an oil seal comprising two axially spaced apart metal plates slightly smaller in diameter than the inside of said hub and having central openings slightly larger in diameter than said shaft, a cork washer concentrically positioned between said plates having an outer diameter slightly larger than the inside of said hub, a felt washer concentrically positioned in said cork washer between said plates having an inner diameter slightly smaller than said shaft, and a spacing tube extending from one plate to the other between said cork and felt washers holding said plates spaced and in frictional contact with said cork washer, whereby adhesion of said cork to said bearing supporting hub comprises the sole means to prevent the rotation of said shaft from rotating said oil seal.

2. For pressing into and sealing the space between the outside of a shaft and the inside of a bearing supporting hub which surrounds the shaft, a seal comprising two axially spaced metal plates loose both in the hub and on the shaft, a cork washer having outside dimensions slightly larger than the bore of said hub, a felt washer within said cork washer having a hole slightly smaller than said shaft, and spacing means between said cork and felt washers connecting said plates and holding them spaced and in frictional contact with said washers, whereby friction between said cork washer and said hub prevents the rotation of said shaft from rotating said seal in said hub.

3. For pressing into and sealing the space between the outside of a shaft and the inside of a bearing supporting hub which surrounds the shaft, a seal comprising two axially spaced metal plates loose on the shaft and in the hub, a cork washer slightly larger than the bore of the hub, a felt washer within said cork washer having a hole slightly smaller than the shaft, and metal spacing means connecting said plates intermediate their outer and inner diameters and holding them in frictional contact with said cork washer.

4. A seal for closing an annular space between a shaft and a bearing hub, comprising two spaced plates fitting loosely in the hub and on the shaft, two resilient washers between said plates one surrounding the other, the outer and inner washer fitting closely to the hub and shaft respectively, the outer being less absorptive, having greater resistance to compression and higher coefficient of friction than the inner, and means intermediate the outer and inner diameter of said plates connecting them together and holding them in frictional contact with said outer washer.

FREDERICK W. COTTERMAN.